(12) United States Patent
Liu et al.

(10) Patent No.: US 10,086,645 B2
(45) Date of Patent: Oct. 2, 2018

(54) HYDRAULIC BUSHING AND RAIL VEHICLE

(71) Applicant: Zhuzhou Times New Material Technology Co., Ltd., Hunan (CN)

(72) Inventors: Jianxun Liu, Hunan (CN); Bo Zou, Hunan (CN); Dan Luo, Hunan (CN); Xingwu Ding, Hunan (CN); Jiling Bu, Hunan (CN); Yaxin Zhang, Hunan (CN); Jo Gross, Hunan (CN); Tao Wang, Hunan (CN)

(73) Assignee: Zhuzhou Times New Material Technology Co., Ltd., Hunan (CN)

( * ) Notice: Subject to any disclaimer, the term of this patent is extended or adjusted under 35 U.S.C. 154(b) by 0 days.

(21) Appl. No.: 15/372,907

(22) Filed: Dec. 8, 2016

(65) Prior Publication Data

US 2018/0154686 A1    Jun. 7, 2018

(30) Foreign Application Priority Data

Dec. 2, 2016   (CN) .......................... 2016 1 1095592

(51) Int. Cl.
*F16F 13/00* (2006.01)
*B60B 17/00* (2006.01)

(52) U.S. Cl.
CPC ....... *B60B 17/0027* (2013.01); *B60Y 2200/30* (2013.01); *B60Y 2410/102* (2013.01)

(58) Field of Classification Search
CPC ...... F16F 13/16; F16F 1/3842; F16F 2230/06; B60B 17/0027; B60Y 2200/30; B60Y 2410/102

(Continued)

(56) References Cited

U.S. PATENT DOCUMENTS

| 4,667,942 A | * | 5/1987 | Bitschkus | ............... F16F 13/14 267/121 |
| 5,123,633 A |   | 6/1992 | Kanda |   |

(Continued)

FOREIGN PATENT DOCUMENTS

| DE | 3631620 A1 | 3/1987 |
| DE | 102006061646 A1 | 7/2007 |
| DE | 102012014318 A1 | 1/2014 |

OTHER PUBLICATIONS

Office Action for a corresponding German Application No. 10 2016 124 050.8 dated Sep. 12, 2017.

*Primary Examiner* — Vishal R Sahni
(74) *Attorney, Agent, or Firm* — Harness, Dickey & Pierce, P.L.C.

(57) ABSTRACT

Disclosed is a hydraulic bushing and a rail vehicle. The hydraulic bushing comprises: a core shaft; a sleeve mounted on the core shaft, wherein a first rubber body is filled in a space formed between the core shaft and the sleeve, and a groove is provided on an outer surface of the sleeve; and an outer housing, which is mounted on the sleeve through press fit. Two liquid chambers for accommodating liquids are provided diametrically opposite to each other on the first rubber body, and the groove and the outer housing together define a flow channel, through which the two liquid chambers communicate with each other. Use of the hydraulic bushing on the rail vehicle not only can assure stable operation of the vehicle in a straight running state thereof, but also can reduce abrasion of a wheel and a rail in a curve running state.

16 Claims, 9 Drawing Sheets

(58) Field of Classification Search
USPC ......... 267/279, 140.12, 140.13, 141.2–141.7
See application file for complete search history.

(56) References Cited

U.S. PATENT DOCUMENTS

| | | | | |
|---|---|---|---|---|
| 6,651,965 | B1* | 11/2003 | Vossel | F16F 13/14 |
| | | | | 267/140.12 |
| 7,441,757 | B2* | 10/2008 | Siemer | 267/140.12 |
| 8,087,648 | B2* | 1/2012 | Auten | F16F 13/16 |
| | | | | 267/140.12 |
| 2003/0098534 | A1* | 5/2003 | Graeve | F16F 13/16 |
| | | | | 267/140.11 |
| 2003/0151178 | A1* | 8/2003 | Vossel | F16F 13/16 |
| | | | | 267/140.12 |
| 2012/0098176 | A1* | 4/2012 | Matsushita | F16F 13/1481 |
| | | | | 267/140.13 |
| 2015/0226285 | A1* | 8/2015 | Schnaars | F16F 13/16 |
| | | | | 267/140.13 |

* cited by examiner

HYDRAULIC BUSHING AND RAIL VEHICLE

FIELD OF THE INVENTION

The present invention relates to the field of rail vehicles, and in particular, to a hydraulic bushing, which can be used on rail vehicles.

BACKGROUND OF THE INVENTION

Rail vehicles can operate simply in two states, of which, a first one is a straight running state, and a second one is a curve running state. In the prior art, a rubber arm is usually used to connect a wheel to a bogie, such that the vehicle can travel quickly and stably along the rail in the straight running state, and turn smoothly along the rail in the curve running state.

In order to enable the vehicle to operate stably in the straight running state, the rubber arm is usually configured to have a relatively large stiffness. However, such a rubber arm with relatively large stiffness will result in severe abrasion of the wheel and the rail in the curve running state, thereby increasing operation costs of the vehicle.

SUMMARY OF THE INVENTION

In view of the above problem, the present invention provides a hydraulic bushing. The use of the hydraulic bushing of the present invention on a rail vehicle not only can assure stable operation of the vehicle in a straight running state, but also can reduce abrasion of a wheel and a rail in a curve running state. The present invention further provides a rail vehicle, in which the hydraulic bushing of the present invention is used.

A hydraulic bushing according to a first aspect of the present invention comprises: a core shaft; a sleeve mounted on the core shaft, wherein a first rubber body is filled in a space formed between the core shaft and the sleeve, and a groove is provided on an outer surface of the sleeve; and an outer housing, which is mounted on the sleeve through press fit. Two liquid chambers for accommodating liquids are provided diametrically opposite to each other on the first rubber body. The groove and the outer housing together define a flow channel, through which the two liquid chambers communicate with each other.

In a rail vehicle, the core shaft of the hydraulic bushing is connected to a bogie of the vehicle, and the outer housing is connected to a positioning arm of a wheel of the vehicle. The hydraulic bushing is usually arranged in such manner that one of the two liquid chambers is located in front while another is located in rear, with respect to a running direction of the vehicle. During curve running of the vehicle, the wheel turns and drives the positioning arm to move, which in turn causes relative movement of the core shaft and the outer housing, thereby achieving steering of both the bogie connected to the core shaft and a vehicle body. During such a procedure, the relative movement of the core shaft and the outer housing causes a front liquid chamber to be compressed, and a rear liquid chamber to be expanded. As a result, a liquid in the front liquid chamber will partially flow through the flow channel to the rear liquid chamber, so as to be adapted to the relative movement of the core shaft and the outer housing and the steering of the wheel. From an overall perspective, during the curve running of the vehicle, the hydraulic bushing according to the present invention has greater flexibility than a rubber arm in the prior art, so as to enable smooth steering of the wheel, thereby reducing abrasion of the wheel and the rail. In a straight running state of the vehicle, liquids in the liquid chambers and the flow channel remain almost still, such that the stiffness of the hydraulic bushing is not significantly varied with respect to the stiffness of a rubber arm in the prior art. As a result, the vehicle can maintain stable operations.

In one embodiment, the core shaft comprises an intermediate section having a first diameter, and two end sections each having a second diameter, the first diameter being greater than the second diameter, and the first rubber body being formed on the intermediate section. An annular sealing assembly is mounted on each of the two end sections.

In one embodiment, the sealing assembly comprises a rigid support ring and a rigid washer, the support ring and the washer being connected together by means of a second rubber body. The support ring is in contact with a step of the core shaft, and the washer is engaged with the outer housing through press fit. According to such a structure, since the support ring and the washer are connected to each other through the second rubber body, relative movement can be generated between the outer housing and the core shaft, thereby enabling smooth steering of the wheel. In addition, the second rubber body can partially absorb energy of movement of the outer housing with respect to the core shaft, thereby buffering lateral movement of the vehicle.

In one embodiment, the washer is located axially outside of the sealing assembly, and a first relief space is formed between the washer and the core shaft. With the first relief space, the washer can move toward the core shaft (i.e., enter the first relief space) under a radially inward compression force caused by the relative movement of the outer housing and the core shaft during the curve running of the rail vehicle. This further contributes to smooth steering of the wheel and reduction in abrasion of the wheel and the rail.

In another embodiment, a top end of the support ring is spaced from the outer housing to form a second relief space. Such being the case, during the curve running of the rail vehicle, the rigid support ring will not prevent the relative movement between the outer housing and the core shaft, thereby facilitating smooth movement of the outer housing with respect to the core shaft, and further enabling smooth steering of the wheel and reducing the abrasion of the wheel and the rail.

In one embodiment, each liquid chamber is formed throughout the first rubber body along an axial direction thereof, and the sealing assembly is in seal contact with the first rubber body and the sleeve, so as to form the liquid chamber. Thus, the liquid chamber of this embodiment has a larger volume than a liquid chamber not passing throughout in the rubber body. As a result, the hydraulic bushing has greater flexibility, so as to reduce the abrasion of the wheel and the rail during the curve running of the vehicle.

In one embodiment, two axial end portions of the first rubber body are respectively formed into annular recesses, an axial matching element being provided in each of the annular recesses in a manner of deviating from an axial end portion of the liquid chamber. The sealing assembly is in seal contact with the matching element and the sleeve, such that the annular recesses form two auxiliary liquid chambers in communication with the two liquid chambers, respectively. With the auxiliary liquid chambers, the amount of the liquid in the hydraulic bushing are increased, thereby increasing a range for adjusting the relative movement between the outer housing and the core shaft of the hydraulic bushing, and further reducing the abrasion of the wheel and the rail during the curve running of the vehicle.

In one preferred embodiment, the flow channel communicates with the auxiliary liquid chamber associated with a first liquid chamber at a first axial end portion of the first rubber body, and with the auxiliary liquid chamber associated with a second liquid chamber at a second axial end portion of the first rubber body.

In one embodiment, each liquid chamber extends in a circumferential direction; and a middle portion of the liquid chamber has a smaller width than an edge portion thereof. According to such a structure, even if the core shaft moves to an extreme position with respect to the outer housing (i.e., a bottom wall of the liquid chamber contacts a top wall thereof), there will be still liquid present at the edge portion of the liquid chamber. This facilitates rapid recovery of the liquid chamber when the core shaft moves away from the extreme position with respect to the outer housing, thereby preventing the hydraulic bushing from being damaged.

In one embodiment, two circumferential edge portions of each liquid chamber are respectively formed into liquid reservoirs which swell radially inward, and the middle portion located between the two circumferential edge portions forms a communication chamber. According to such a structure, even if the core shaft moves beyond the extreme position with respect to the outer housing so that the communication chamber completely disappears, liquid will still remain in the liquid reservoir of the liquid chamber. This further facilitates rapid recovery of the liquid chamber after the core shaft moves away from the extreme position with respect to the outer housing, thereby preventing the hydraulic bushing from being damaged. Moreover, after the communication chamber disappears, the liquid reservoir and the auxiliary liquid chamber communicating therewith will still contribute to maintaining of the flexibility of the hydraulic bushing. In addition, the liquid reservoir radially swelling inward causes a portion of first rubber body between the sleeve and the liquid chamber to be smaller than a portion of the first rubber body between the sleeve and the core shaft. Thus, the liquid chamber will be more responsive to the relative movement of the outer housing and the core shaft, so as to be more responsively adapted to the steering of the wheel and to reduce the abrasion of the wheel and the rail.

In one embodiment, the intermediate section of the core shaft has an arcuate surface bulging radially outward. The arcuate surface can avoid stress concentration generated on the intermediate section of the core shaft, when the core shaft moves with respect to the sleeve. Moreover, compared with a core shaft with an intermediate section of a same radial dimension, such a core shaft comprising an intermediate section with a middle region having a greater radial dimension than two ends thereof enables a greater range of relative movement between the outer housing and the core shaft, thus facilitating conformity to steering of the wheel. In addition, the core shaft of such a form is also favorable for achievement of a width of the middle portion of the liquid chamber smaller than that of the edge portion thereof.

In one embodiment, the core shaft comprises a columnar body having two end sections and an intermediate section, and an annular body removably mounted on the intermediate section, the annular body having an arcuate surface radially bulging outward. According to such a structure, during manufacture of the hydraulic bushing, the annular body and the columnar body can be separately produced, and only the first rubber body and the annular body are then fit together to form an assembly, which is to be assembled with the columnar body. The outer housing and other auxiliary components (if any) are finally mounted to form the hydraulic bushing. However, according to the present embodiment, it is unnecessary to handle the core shaft and the columnar body when the assembly is being manufactured. Instead, only the annular body is necessary to be handled, thereby remarkably reducing the manufacture difficulty and costs.

In one embodiment, the groove has a length in the range from 1 and 4 m, and a square cross section (the square herein cannot be understood in its mathematical sense, but has an appropriate chamfer at a corner thereof). Preferably, the groove has a cross-sectional area in the range from 4 and 25 $mm^2$. In one embodiment, the liquid chamber has an equivalent piston area in the range from 1,000 and 10,000 $mm^2$. It has been unexpectedly found, when the groove and the liquid chamber are configured in a manner as described above, the hydraulic bushing shows flexibility greater than that of an existing rubber arm during the curve running of the vehicle, and stiffness close to that of the existing rubber arm during the straight running of the vehicle. In addition, the groove (or the flow channel) has sharp edges and corners, where turbulence of the liquid increases, thereby increasing flow resistance of the liquid in the groove (or the flow channel). During operation of the vehicle, the flow resistance helps to consume vibration energy generated thereby, thus further improving stable operation of the vehicle.

In one embodiment, the groove is helical, so that it is convenient to construct a groove having a relatively large length.

In one embodiment, the sleeve is made of nylon-66. This facilitates rapid injection molding of the sleeve, thus reducing manufacturing costs. In addition, nylon-66 also has certain flexibility, thus facilitating press fit between the sleeve and the outer housing. It should be understood that the sleeve can also be made of other rigid materials, such as steel, as required.

A rail vehicle according to a second aspect of the present invention comprises the hydraulic bushing as described above, wherein the core shaft of the hydraulic bushing is connected to a bogie of the rail vehicle, and the outer housing of the hydraulic bushing is connected to a positioning arm of a wheel of the rail vehicle. And the two liquid chambers are arranged in tandem. The hydraulic bushing of the present invention can be mounted on the rail vehicle not only to enable smooth steering the wheel during the curve running of the vehicle, thereby reducing abrasion of the wheel and the rail, but also to provide a relatively large stiffness for the vehicle during the straight running thereof, thus maintaining stable operation of the vehicle.

Compared with the prior art, the present invention has the following advantages. The hydraulic bushing of the present invention is provided with the first rubber body, the liquid chambers, and the flow channel. The liquid chambers and the flow channel can not only enable smooth steering of the wheel during the curve running of the vehicle, thereby reducing the abrasion of the wheel and the rail, but also provide a relatively large stiffness for the vehicle during the straight running thereof, so as to maintain stable operation of the vehicle.

BRIEF DESCRIPTION OF THE DRAWINGS

The present invention will be explained in more detail with reference to embodiments and accompanying drawings, in which.

In the accompanying drawings, the same components are indicated by the same reference signs. The accompanying drawings are not drawn to an actual scale.

DETAILED DESCRIPTION OF THE EMBODIMENTS

The present invention will be further described with reference to the accompanying drawings.

Figure 1:
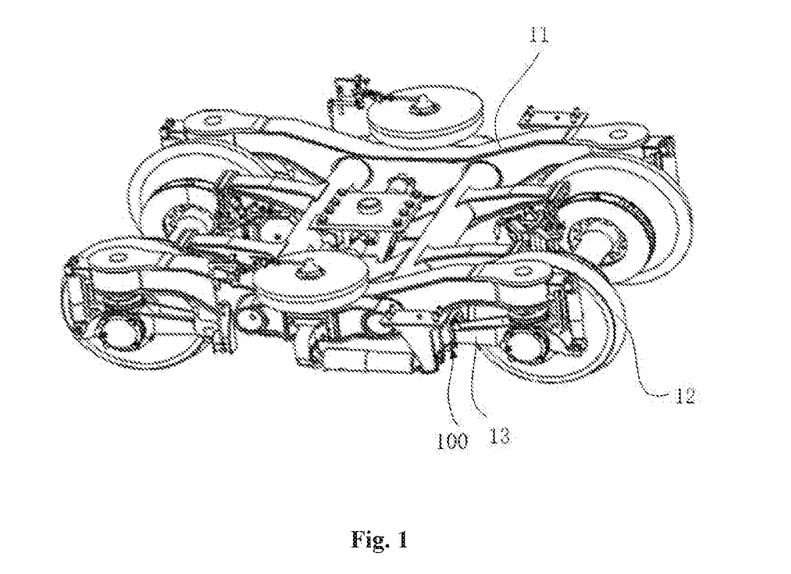
FIG. 1 schematically shows a mounting position of a hydraulic bushing in a rail vehicle according to one embodiment of the present invention.

FIG. 1 schematically shows a mounting position 100 of a hydraulic bushing 1 in a rail vehicle according to one embodiment of the present invention. As illustrated in FIG. 1, the rail vehicle includes a bogie 11 and wheels 12, each having a positioning arm 13. The hydraulic bushing 1 is simultaneously connected to the bogie 11 and one of the wheels 12, in a manner as specifically described below. During straight running of the rail vehicle, the hydraulic bushing 1 has a relatively large stiffness, which contributes to stable running of the vehicle; while during curve running of the rail vehicle, the hydraulic bushing 1 has a relatively great flexibility, which facilitates smooth steering of the wheel 12, and thus reduces abrasion of the wheel 12 and a rail.

FIGS. 2, 3, 4 and 5 show one embodiment of the hydraulic bushing 1. As indicated in FIGS. 2-5, the hydraulic bushing 1 includes a core shaft 20, a sleeve 47 mounted on the core shaft 20, and an outer housing 22 mounted on the sleeve 47 through press fit. Two ends of the core shaft 20 are connected to the bogie 11, and the outer housing 22 is connected to the positioning arm 13. Such connections are well known to those skilled in the art, and thus will not be described in detail herein.

A space formed between the core shaft 20 and the sleeve 47 is filled with a first rubber body 40, on which two liquid chambers 41 for accommodating a liquid are provided diametrically opposite to each other. A groove 42 is formed on an outer surface of the sleeve 47, and the outer housing 22 is provided therein with a liquid feeding hole 29 communicating with the groove 42. When assembled, the groove 42 defines, together with the outer housing 22, a flow channel for the liquid, and two ends of the flow channel are in communication with the two liquid chambers 41, respectively, such that the liquid can flow to and from the two liquid chambers 41.

During curve running of the rail vehicle, movement of the wheel 12 will cause relative movement between the core shaft 20 and the outer housing 22. At this time, a liquid chamber 411 located in front will be compressed, while a liquid chamber 412 located in rear will be expanded. Thus, the liquid in the liquid chamber 411 will flow into the liquid chamber 412 through the flow channel, so as to enable the hydraulic bushing 1 to be adapted to the steering of the wheel 12. The hydraulic bushing 1 with such a structure has greater flexibility than an existing rubber arm, thereby reducing abrasion of the wheel 12 and the rail. During rapid straight running of the rail vehicle, the liquid in the liquid chamber 41 and that in the flow channel 42 remain almost still. This allows non-significant variation in stiffness of the hydraulic bushing 1 as compared with that of the rubber arm in the prior art, thereby enabling stable operation of the vehicle.

Figure 6:
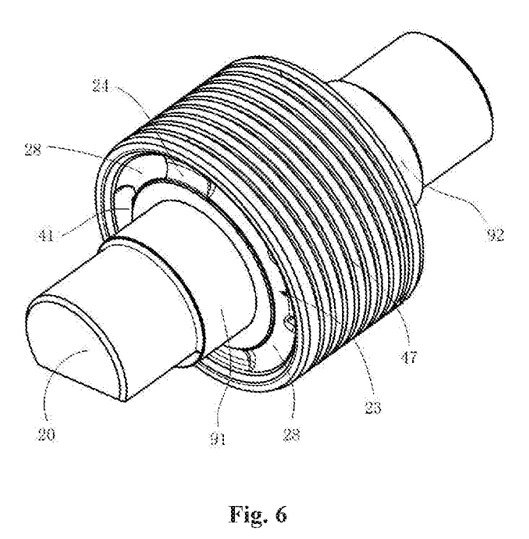
FIG. 6 is a perspective view of the hydraulic bushing shown in FIG. 2 with an outer housing and a sealing assembly thereof removed.
Figure 7:
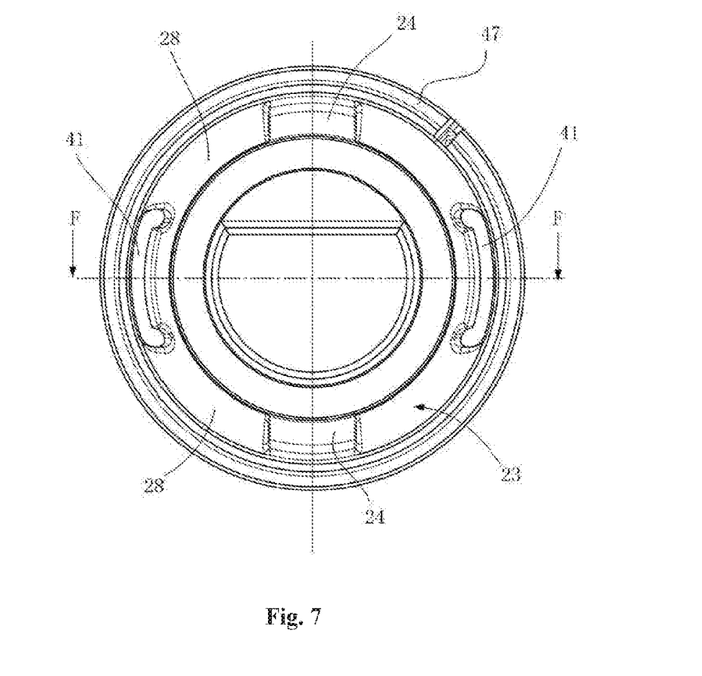
FIG. 7 is a left view of FIG. 6.

The hydraulic bushing 1 can be produced as follows. The core shaft 20 and the sleeve 47 are put into in a suitable mold, followed by injection of the first rubber body 40 in a liquid state therein. After the first rubber body 40 in a liquid state is cooled and solidified, demolding is performed to obtain the hydraulic bushing 1 in a state shown in FIG. 6. The outer sleeve 22 is then mounted to the sleeve 47 through press fit. The liquid chamber 41 is formed by means of the mold, so as to be arbitrarily adjustable in shape and size as required. The liquid chamber 41 is formed inside of the first rubber body 40, i.e., a bottom wall 50 and a top wall 51 thereof are both formed by the first rubber body 40.

Figure 4:
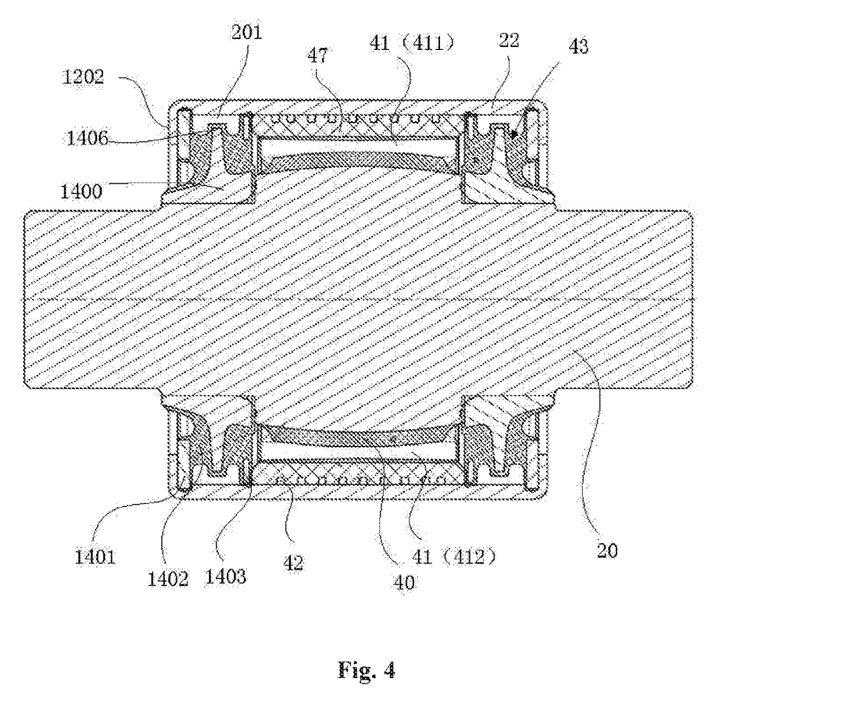
FIG. 4 is a cross-section view of FIG. 2 along line B-B.
Figure 8:
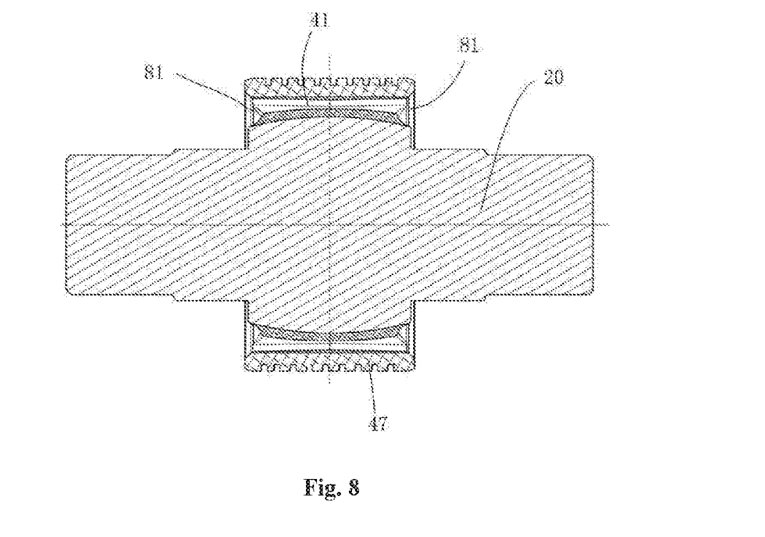
FIG. 8 is a cross-section view of FIG. 7 along line F-F.
Figure 17:
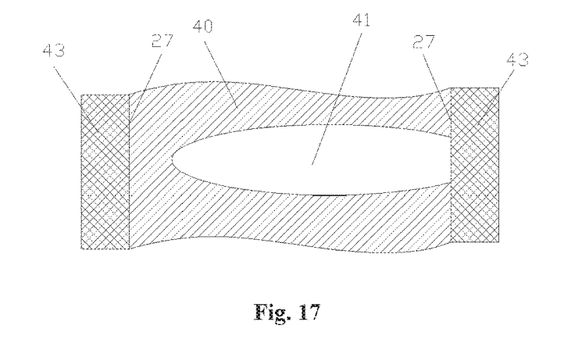
FIG. 17 schematically shows another embodiment of a liquid chamber.
Figure 18:
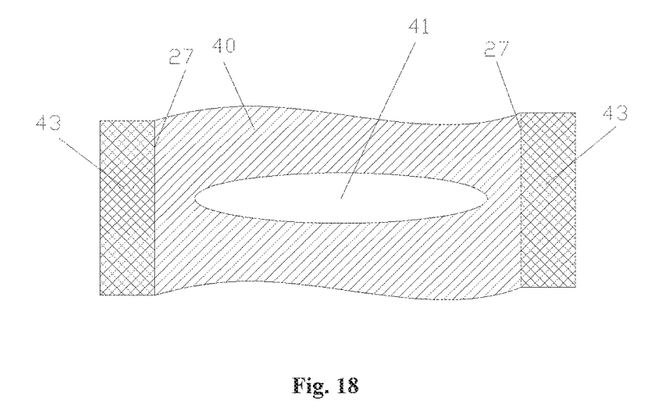
FIG. 18 schematically shows a further embodiment of the liquid chamber.

In one embodiment, the liquid chamber 41 is formed axially through the first rubber body 40, as shown in FIG. 8. In this case, in order to form a closed liquid chamber 41, two sealing assemblies 43 are separately mounted on two end sections 91 and 92 of the core shaft 20. As shown in FIG. 4, the two sealing assemblies 43 respectively seal axial end portions 81 of the liquid chamber 41, so as to form the closed liquid chamber 41. It should be understood that the liquid chamber 41 can also be formed in the first rubber body 40 by other means. For example, as shown in FIG. 17, one axial end portion of the liquid chamber 41 is closed by the first rubber body 40, while the other axial end portion is closed by the sealing assembly 43. Reference can be further made to FIG. 18, wherein the liquid chamber 41 is formed in the first rubber body 40 in a completely closed manner. It should be understood that in the embodiments as shown in FIGS. 17 and 18, the sealing assemblies 43 are still mounted on both of the end sections 91 and 92 of the core shaft 20, so as to play sealing and supporting roles as required.

In one embodiment, the liquid chamber 41 extends in a circumferential direction. A middle portion 53 of the liquid chamber 41 has a width W1 smaller than a width W2 of an edge portion 54 thereof. Thus, when the outer housing 22 and the core shaft 20 move with respect to each other to an extreme position (i.e., the bottom wall 50 of the liquid chamber 41 is in contact with the top wall 51 thereof), there will still be liquid present at the edge portion 54 of the liquid chamber 41. After the outer housing 22 and the core shaft 20 move with respect to each other away from the extreme position, the liquid chamber 41 will be quickly restored, thus preventing the hydraulic bushing 1 from being damaged.

Figure 5:
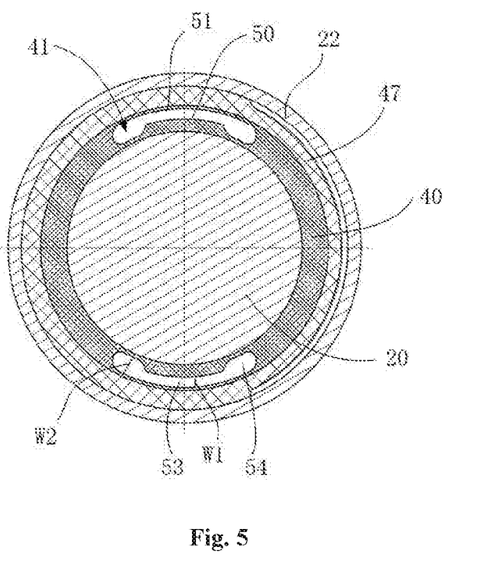
FIG. 5 is a cross-section view of FIG. 2 along line C-C.

In one preferred embodiment, the two circumferential edge portions 54 of the liquid chamber 41 respectively form two liquid reservoirs radially expanding inward, and the middle portion 53 located between the two edge portions 54 forms a communication chamber. With such a structure, even if the communication chamber 53 is compressed and completely disappears, liquid will still remain in the liquid reservoirs 54, such that the liquid chamber 41 can be quickly restored. In addition, as the liquid reservoirs 54 expand radially inward, as shown in FIG. 5, the liquid chamber 41 can be configured to be nearer to the sleeve 47. As a result, during curve running of the rail vehicle, there is almost no buffering action of the first rubber body 40 between the liquid chamber 41 and the outer housing 22. Thus, pressure in the liquid chamber 41 will be more responsive to the relative movement between the outer housing 22 and the core shaft 20, thereby enabling the hydraulic bushing 1 to be more responsively adapted to the steering of the wheel 12 and reducing abrasion of the wheel 12 and the rail.

Figure 9:
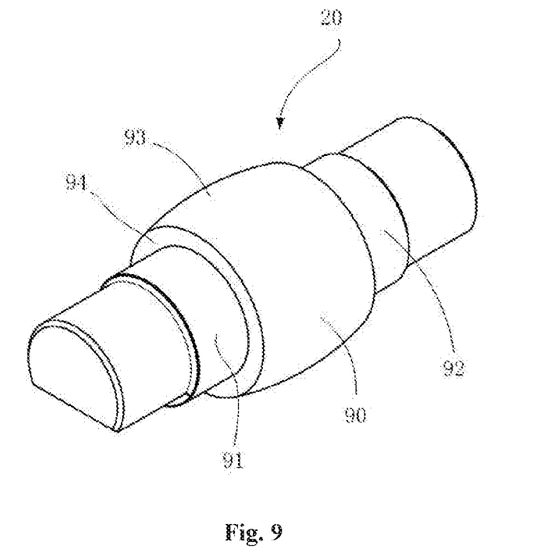
FIG. 9 is a perspective view of a core shaft of the hydraulic bushing shown in FIG. 2.

The core shaft 20 is a preform, and FIG. 9 shows a first embodiment thereof in the form of a stepped shaft. As shown in FIG. 9, in addition to the two end sections 91 and 92, the core shaft 20 further includes an intermediate section 90, which has a greater diameter than either of the end sections 91 and 92. Preferably, the end sections 91 and 92 have an equal diameter. The first rubber body 40 is formed on the intermediate section 90. Preferably, an axial length of the sleeve 47 and that of the outer housing 22 both match an axial length of the intermediate section 90.

Figure 3:
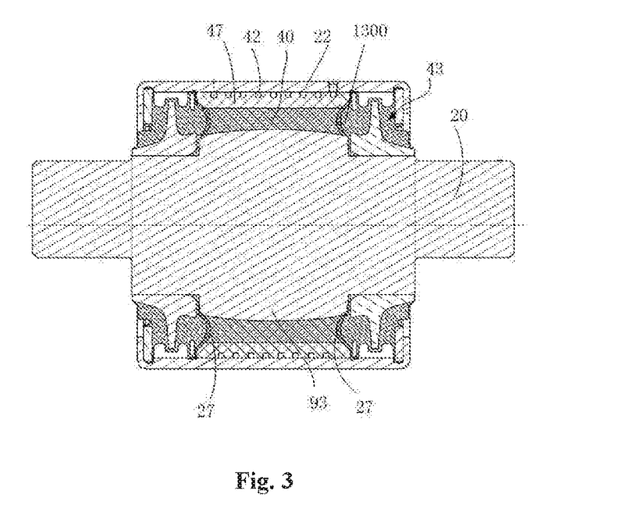
FIG. 3 is a cross-section view of FIG. 2 along line A-A.

In one embodiment, the intermediate section 90 of the core shaft 20 has an arcuate surface 93 radially bulging outward, as shown in FIGS. 3, 4, and 9. In one embodiment, a central region 96 of the arcuate surface 93 has a radius of 40 mm, and an edge region 97 of the arcuate surface 93 has a radius of 39 mm. It should be understood that the arcuate surface 93 can be configured with other radii as required. From an overall perspective, the intermediate section 90 is substantially in the shape of a barrel with a middle portion thereof bulging outward. The arcuate surface 93 can prevent generation of stress concentration on the core shaft 20, thereby preventing the hydraulic bushing 1 from being damaged. In addition, the arcuate surface 93 can also be favorable for the configuration that a width of the middle portion 53 of the liquid chamber 41 is smaller than that of the edge portion 54 thereof, as described above.

Figure 10:
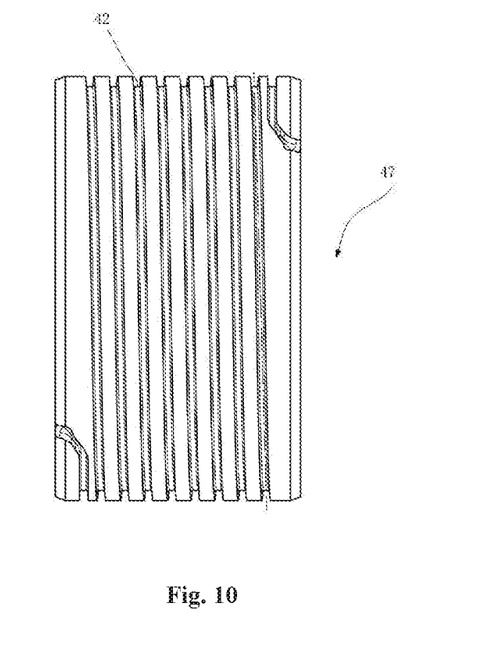
FIG. 10 is a front view of a sleeve of the hydraulic bushing shown in FIG. 2.
Figure 11:
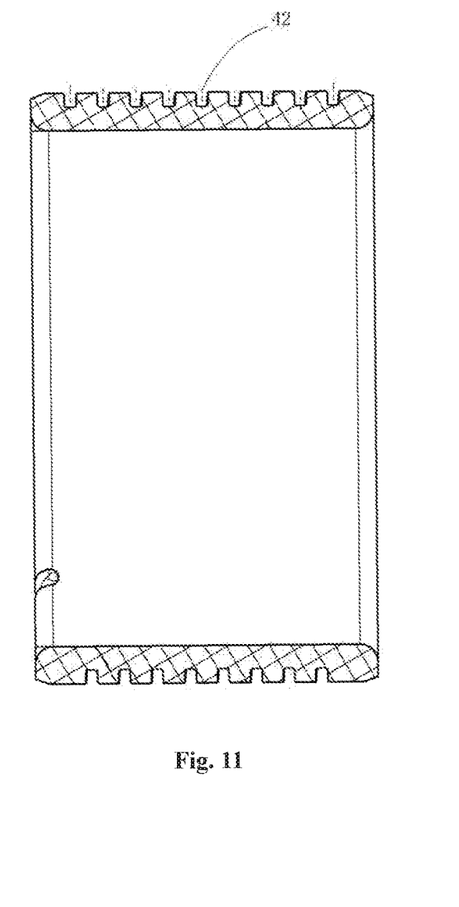
FIG. 11 is an axial cross-section view of the sleeve shown in FIG. 10.

The sleeve 47 is substantially a cylindrical perform, and FIG. 10 shows one embodiment thereof. As indicated in FIGS. 10 and 11, the groove 42 can be formed in advance on the outer surface of the sleeve 47 by machining, so as to be arbitrarily adjustable in both length and shape as required.

Figure 2:
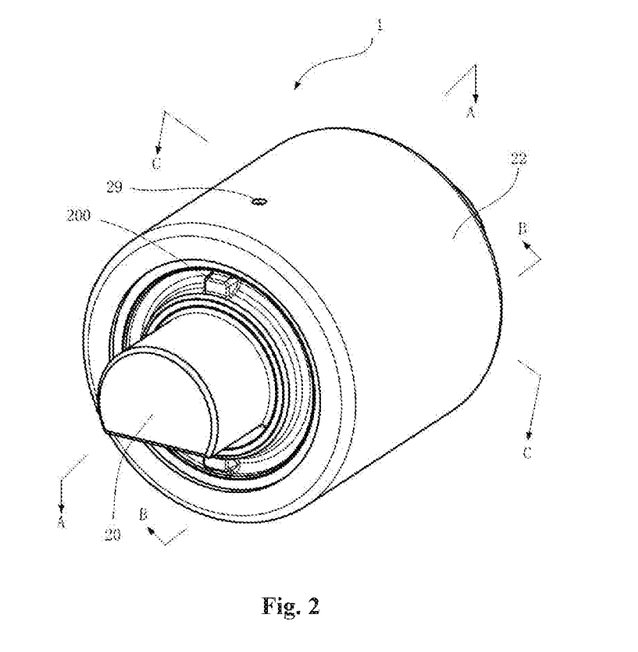
FIG. 2 shows a perspective view of the hydraulic bushing according to one embodiment of the present invention.
Figure 12:
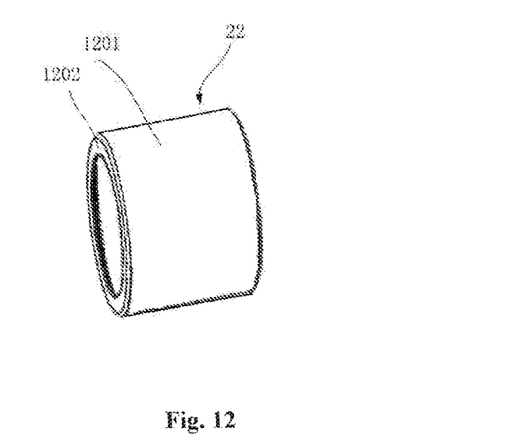
FIG. 12 shows a perspective view of the outer housing of the hydraulic bushing shown in FIG. 2.

The outer housing 22 is substantially a cylindrical preform, and FIG. 12 shows one embodiment thereof. As indicated in FIGS. 2 and 12, the outer housing 22 includes a main body 1201 and flanges 1202 radially bent inward at two axial end portions thereof. The flanges 1202 can press the sealing assemblies 43 in an axial direction, so as to enable the sealing assemblies 43 to seal the end portions 81 of the liquid chamber 41. While being mounted, the outer housing 22, which is in the form of a straight tube, can first be mounted on the sleeve 47, followed by formation of the flanges 1202 by means of a flanging machine. The flanging machine is well known to those skilled in the art, and thus will not be described herein.

Figure 13:
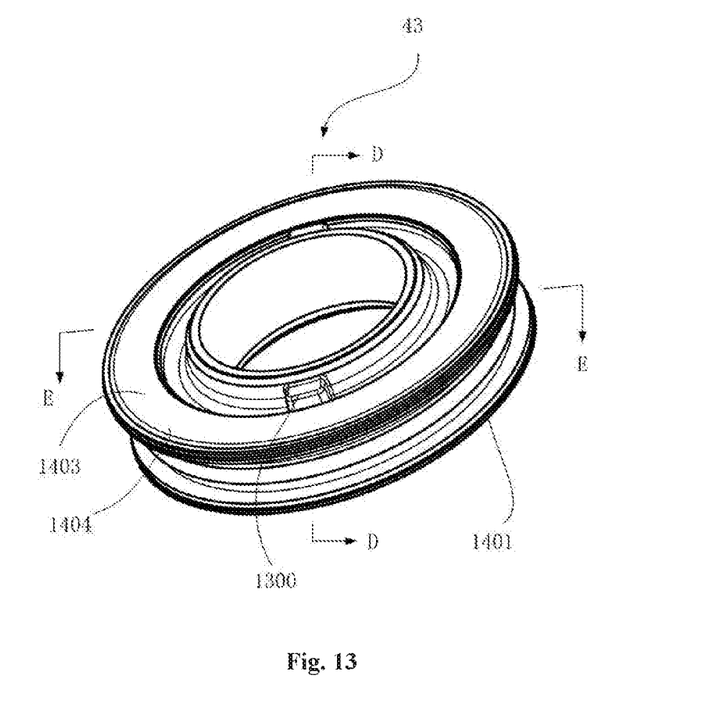
FIG. 13 shows a perspective view of the sealing assembly of the hydraulic bushing shown in FIG. 2.
Figure 14:
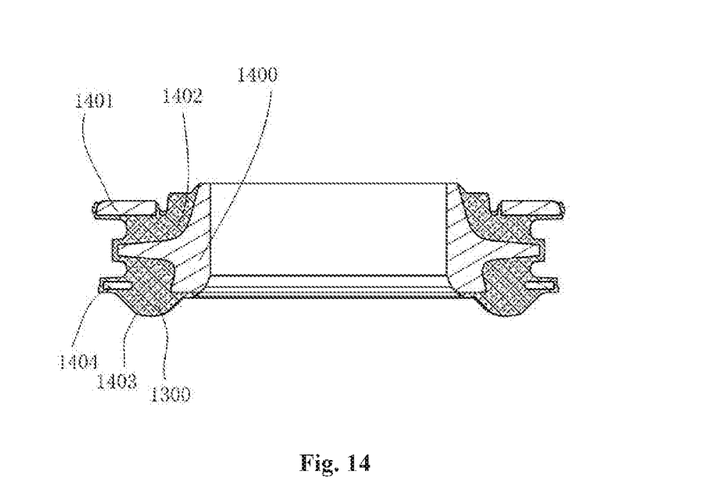
FIG. 14 shows a cross-section view of FIG. 13 along line D-D.
Figure 15:
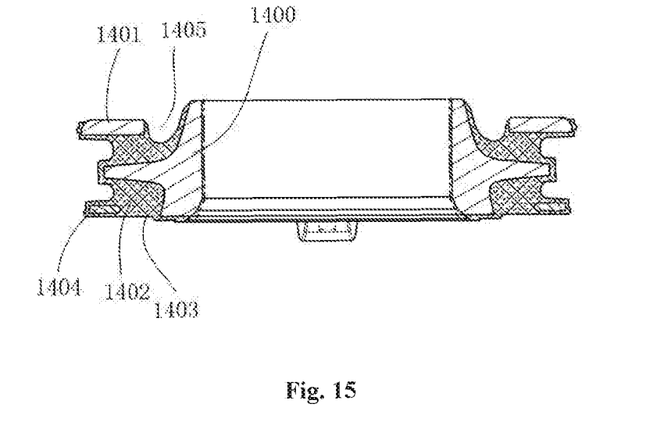
FIG. 15 shows a cross-section view of FIG. 13 along line E-E.

The sealing assembly 43 can be a separately manufactured component, and FIG. 13 shows an example thereof. Specifically, as shown in FIGS. 14 and 15, the sealing assembly 43 includes a rigid support ring 1400 and a rigid washer 1401, which are connected to each other by means of a second rubber body 1402. In the hydraulic bushing 1, the sealing assembly 43 is positioned through contacting a step 94 of the core shaft 20 with the support ring 1400; the washer 1401 is engaged with the outer housing 22 through press fit; and an inner surface 1403 of the sealing assembly 43, formed by the second rubber body 1402, is in seal contact with an axial end portion of the sleeve 47 and an axial end portion 27 of the first rubber body 40, so as to seal the axial end portion 81 of the liquid chamber 41. The sealing assembly 43 further includes a second washer 1404 that can press the axial end portion of the outer housing 22, in order to provide a better seal contact between the inner surface 1403 and the axial end portion of the outer housing 22.

The second rubber body 1402 is used to achieve radial movement of the outer housing 22 relative to the core shaft 20 during curve running of the vehicle, when, for example, the outer housing 22 will push the washer 1401 radially inward. Due to elasticity of the second rubber body 1402 provided between the washer 1401 and the support ring 1400, the washer 1401 will be pushed to move radially inward, so as to achieve relative movement between the outer housing 22 and the core shaft 20 and to deform the liquid chamber 41.

In one embodiment, a top end 1406 of the support ring 1400 is spaced from the outer housing 22, to form a second relief space 201, as shown in FIG. 4. And a first relief space 1405 is formed between the core shaft 20 and the washer 1401 located outside the sealing assembly 43 in an axial direction, as shown in FIG. 15. More preferably, the first relief space 1405 faces the liquid chamber 41 directly. During curve running of the vehicle, the second relief space 201 can prevent the support ring 1400 from interfering with the relative movement between the outer housing 22 and the core shaft 20, while the first relief space 1405 can be more advantageous for radially inward movement of the washer 1401.

Reference can be made to FIG. 6 again. The two axial end portions 27 of the first rubber body 40 are formed into annular recesses 23, respectively. In each of the annular recesses 23, an axial matching element 24 is provided to deviate from the axial end portion 81 of the liquid chamber 41. And as shown in FIG. 13, the sealing assembly 43 has a sealing element 1300 that matches the matching element 24. After the sealing assembly 43 is mounted on the core shaft 20, the sealing element 1300 will be in seal contact with the matching element 24, thus dividing the annular recess 23 into two auxiliary liquid chambers 28, which communicate with the two liquid chambers 41, respectively. Such a structure brings about the following beneficial effects. With the auxiliary liquid chambers 28, the amount of liquid in the hydraulic bushing 1 can be increased, thereby increasing a range for adjusting the relative movement between the outer housing 22 and the core shaft 20 of the hydraulic bushing 1, and further reducing the abrasion of the wheel 12 and the rail during the curve running of the vehicle. In one preferred embodiment, the matching element 24 is an axially inward recess, while the sealing element 1300 is an axially outward projection (as shown in FIGS. 3 and 15).

Engagement between the matching element 24 and the sealing element 1300 contributes to improvement of a sealing effect.

Reference can be made to FIG. 2 again. A mounting indication block 200 is provided on an outer surface of the sealing assembly 43, so as to ensure that the hydraulic bushing 1 with the sealing assembly 43 can be properly mounted to the vehicle.

The structures of the groove 42 (i.e., the flow channel) and the liquid chamber 41 can be designed according to practical requirements, so as to adjust the mechanical properties of the hydraulic bushing 1 to adapt to straight running and curve running of the rail vehicle. For example, the groove 42 can have a length in the range from 1 to 4 m, and a rectangular cross-section with a cross-sectional area in the range from 4 to 25 mm$^2$. The liquid chamber 41 can have an equivalent piston area in the range from 1,000 to 10,000 mm$^2$. The core shaft 20, the outer housing 22, the support ring 1400, and the washer 1401 can all be steel products or other types of rigid metal products. The sleeve 47 can be made of nylon-66.

In one specific embodiment, the hydraulic bushing 1 can be configured such that the flow channel 42 is helical with a length of 3.418 mm, and has a square cross section with a side length of 3 mm (an area of 9 mm$^2$); and the liquid chamber 41 has an equivalent piston area of 7.383 mm$^2$. In another specific embodiment, the hydraulic bushing 1 can be configured such that the flow channel 42 is helical with a length of 3.300 mm, and has rectangular cross-section with a length of 3 mm and a width of 2.5 mm (an area of 7.5 mm$^2$); and the liquid chamber 41 has an equivalent piston area of 7.428 mm$^2$.

Figure 16:
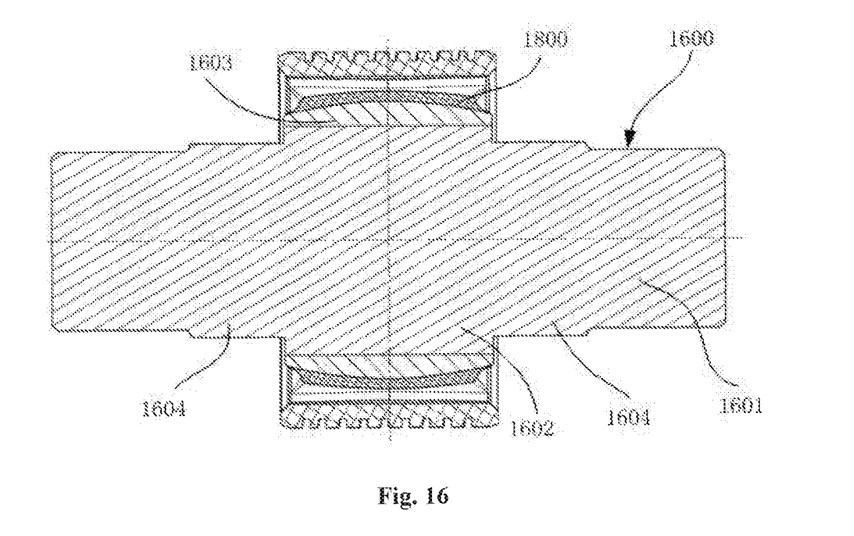
FIG. 16 shows a structural view of a hydraulic bushing (with a sealing assembly and an outer housing thereof removed) according to another embodiment of the present invention.

FIG. 16 shows a second embodiment of the hydraulic bushing 1. In the second embodiment as shown in FIG. 16, a core shaft 1600 includes a columnar body 1601 having two end sections 1604 and an intermediate section 1602, and an annular body 1603 removably mounted on the intermediate section 1602. The annular body 1603 has an arcuate surface 1800 bulging radially outward. Thus, after being mounted on the core shaft 1600, the annular body 1603 will be almost exactly the same as the intermediate section 90 of the core shaft 20 shown in FIG. 2 in both shape and function. In one embodiment, the columnar body 1601 can be cylindrical or a stepped shaft. For example, the intermediate section 1602 can have a greater diameter than either of the two end sections 1604, which facilitates mounting of the sealing assembly 43.

Figure 19:
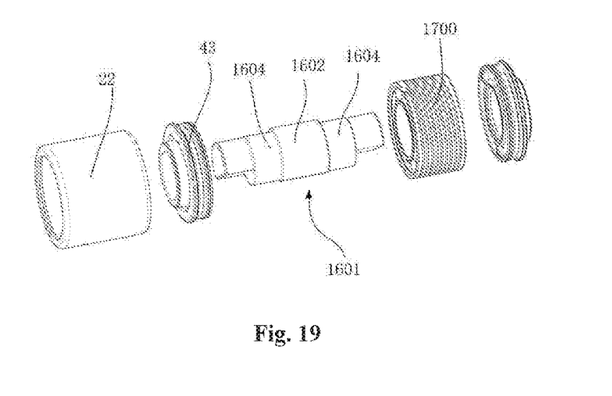
FIG. 19 schematically shows an exploded view of the structure of the hydraulic bushing shown in FIG. 16.

As a whole, the second embodiment of the hydraulic bushing 1 is substantially the same as the first embodiment thereof in structure. The difference therebetween lies in that, in the second embodiment, the annular body 1603 and the columnar body 1601 of the core shaft 1600 are two independently manufactured components, i.e. the core shaft 1600 comprises two independently manufactured components. However, in the first embodiment, the core shaft 20 is a one-piece component. The second embodiment of the hydraulic bushing 1 has the following advantageous effects. During manufacture of the hydraulic bushing 1, the sleeve 47, the first rubber body 40, and the annular body 1603 can first be fit together to form an assembly 1700 (as shown in FIG. 19), and the assembly 1700, the outer housing 22, the sealing assembly 43 (if any), and the columnar body 1601 can then be assembled together to form the hydraulic bushing 1. Thus, according to the second embodiment of the hydraulic bushing 1, it is only necessary to handle the annular body 1603 with a small size (which can have a length, for example, only in the range from 50 to 100 mm) to obtain the assembly 1700, followed by simple mounting of the assembly 1700 on the columnar body 1601, while the columnar body 1601 (or the core shaft 20) is no longer handled constantly. As a result, according to the second embodiment of the hydraulic bushing 1, both manufacture difficulty and manufacture costs of the hydraulic bushing 1 can be reduced.

It should be noted that, the singular forms "a(n)", "one", and "the" as used here in the description, abstract, and claims of the present invention, are intended to include the plural forms as well, unless the context clearly indicates otherwise.

Although the present invention has been described with reference to preferred embodiments, various modifications and variants to the present invention may be made by anyone skilled in the art, without departing from the scope and spirit of the present invention. In particular, as long as there is no structural conflict, the respective technical features mentioned in various embodiments may be combined with one another in any manner. The present invention is not limited to the specific embodiments disclosed herein, but rather includes all the technical solutions falling within the scope of the claims.

The invention claimed is:

1. A hydraulic bushing, comprising:
   a core shaft,
   a sleeve mounted on the core shaft, wherein a first rubber body is filled in a space formed between the core shaft and the sleeve, and a groove is provided on an outer surface of the sleeve, and
   an outer housing, which is mounted on the sleeve through press fit,
   wherein two liquid chambers for accommodating liquids are provided diametrically opposite to each other in the first rubber body, the two liquid chambers being entirely confined within the first rubber body in at least one of a radial direction and a circumferential direction of the core shaft, and the groove and the outer housing together define a flow channel, through which the two liquid chambers communicate with each other;
   wherein the core shaft includes an intermediate section having a first diameter, and two end sections each having a second diameter, the first diameter being greater than the second diameter, and the first rubber body being on the intermediate section;
   wherein an annular sealing assembly is on each of the two end sections;
   wherein the sealing assembly includes a rigid support ring and a rigid washer, the rigid support ring and the washer being connected together through a second rubber body; and
   wherein the rigid support ring is in cooperation with a step of the core shaft in an axial direction to axially position the sealing assembly, and the washer is engaged with the outer housing through press fit.

2. The hydraulic bushing according to claim 1, wherein the washer is located at an axially outer edge of the sealing assembly, and a first relief space is defined between the washer and the core shaft.

3. The hydraulic bushing according to claim 1, wherein a top end of the rigid support ring is spaced from the outer housing and defines a second relief space.

4. The hydraulic bushing according to claim 1, wherein each liquid chamber is formed throughout the first rubber body along an axial direction thereof, and
   wherein the sealing assembly is in seal contact with the first rubber body and the sleeve, so as to form the liquid chamber.

5. The hydraulic bushing according to claim 4, wherein two axial end portions of the first rubber body are respectively formed into annular recesses, and wherein an axial matching element deviated from the liquid chamber is provided in each of the annular recesses, and wherein the sealing assembly is in seal contact with the matching element and the sleeve, such that the annular recesses define two auxiliary liquid chambers in communication with the two liquid chambers, respectively.

6. The hydraulic bushing according to claim 5, wherein the flow channel communicates with the auxiliary liquid chamber associated with a first liquid chamber of the two liquid chambers at a first axial end portion of the first rubber body, and with the auxiliary liquid chamber associated with a second liquid chamber of the two liquid chambers at a second axial end portion of the first rubber body.

7. The hydraulic bushing according to claim 5, wherein each liquid chamber extends in a circumferential direction, and wherein a middle portion of each liquid chamber has a smaller width than an edge portion thereof.

8. The hydraulic bushing according to claim 7, wherein two circumferential edge portions of each liquid chamber are respectively formed into liquid reservoirs which swell radially inward, and the middle portion located between the two circumferential edge portions forms a communication chamber.

9. The hydraulic bushing according to claim 1, wherein the intermediate section of the core shaft has an arcuate surface bulging radially outward.

10. The hydraulic bushing according to claim 1, wherein the core shaft comprises a columnar body having two end sections and an intermediate section, and an annular body removably mounted on the intermediate section, and wherein the annular body has an arcuate surface radially bulging outward.

11. The hydraulic bushing according to claim 1, wherein the groove has a length in the range from 1 and 4 m.

12. The hydraulic bushing according to claim 11, wherein each liquid chamber has an equivalent piston area in the range from 1,000 and 10,000 $mm^2$.

13. The hydraulic bushing according to claim 11, wherein the groove has a rectangular cross-section.

14. The hydraulic bushing according to claim 13, wherein the groove has a cross-sectional area in the range from 4 and 25 $mm^2$.

15. The hydraulic bushing according to claim 1, wherein the sleeve is made of nylon-66.

16. A rail vehicle, comprising the hydraulic bushing according to claim 1, wherein the core shaft of the hydraulic bushing is connected to a bogie of the rail vehicle, and the outer housing of the hydraulic bushing is connected to a positioning arm of a wheel of the rail vehicle, and wherein the two liquid chambers are arranged in tandem.

* * * * *